United States Patent [19]

Saunders et al.

[11] 4,449,290

[45] May 22, 1984

[54] POWER INSERTABLE NYLON COATED MAGNET WIRE

[75] Inventors: Hollis S. Saunders; Richard V. Carmer; Lionel J. Payette, all of Fort Wayne, Ind.

[73] Assignee: Essex Group, Inc., Fort Wayne, Ind.

[21] Appl. No.: 508,786

[22] Filed: Jun. 29, 1983

Related U.S. Application Data

[62] Division of Ser. No. 312,214, Oct. 19, 1981, Pat. No. 4,410,592.

[51] Int. Cl.[3] .......... B32B 27/00; H01B 7/00

[52] U.S. Cl. .......... 29/596; 29/606; 427/118; 427/120

[58] Field of Search .......... 427/118, 120; 428/375, 428/379, 383; 174/120 SR, 120 C, 110 N, 110 SR; 29/596, 598, 606; 252/52 R, 56 R, 56 S; 242/1.1 H, 1.1 R, 7.03, 7.05 A, 7.05 B, 7.05 C, 7.06, 7.07

[56] References Cited

U.S. PATENT DOCUMENTS

| | | | |
|---|---|---|---|
| 3,513,252 | 5/1970 | Schoerner | 428/383 |
| 3,600,310 | 8/1971 | Eyres et al. | 252/56 R |
| 3,953,649 | 4/1976 | Suzuki et al. | 428/383 |
| 3,975,571 | 8/1976 | Kawaguchi et al. | 428/383 |
| 4,004,063 | 1/1977 | Peterson et al. | 428/383 |
| 4,163,826 | 8/1979 | Kawaguchi | 174/110 N |
| 4,216,263 | 8/1980 | Otis et al. | 428/383 |

FOREIGN PATENT DOCUMENTS

| | | | |
|---|---|---|---|
| 525420 | 5/1956 | Canada | 252/56 R |
| 55-80204 | 6/1980 | Japan | 174/120 SR |
| 55-80208 | 6/1980 | Japan | 174/120 SR |

*Primary Examiner*—Norman Morgenstern
*Assistant Examiner*—Richard Bueker
*Attorney, Agent, or Firm*—Harry J. Gwinnell

[57] ABSTRACT

A magnet wire having a nylon outer coating is described which is capable of power insertion into coil slots in a locking wire size range by virtue of a specific lubricant outer coating. The external lubricant comprises a mixture of paraffin wax and hydrogenated triglyceride. An internal lubricant composition comprised of esters of fatty alcohols and fatty acids and/or hydrogenated triglyceride can be added to the nylon coatings to provide greater ease of insertability.

13 Claims, 1 Drawing Figure

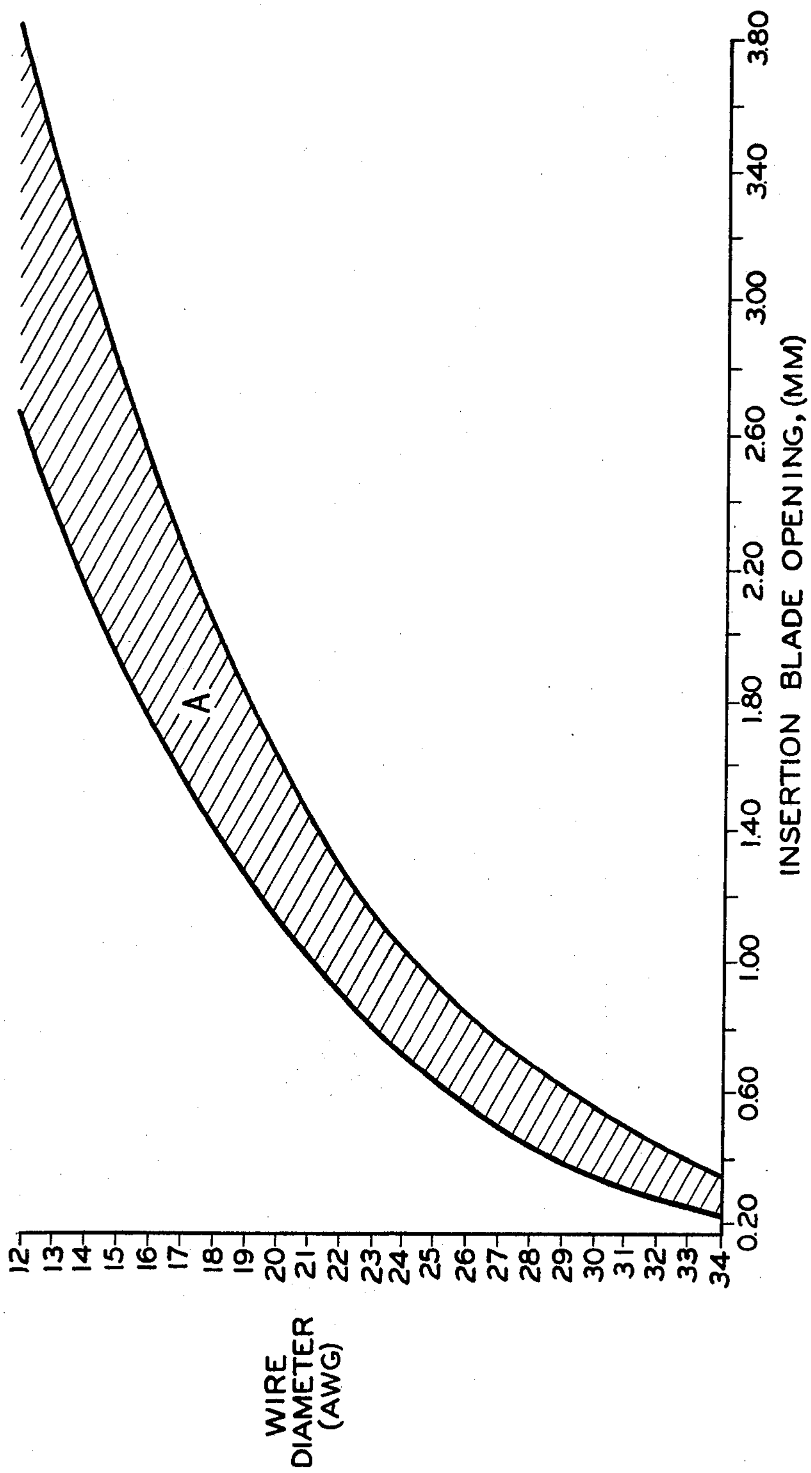
A
INSERTION BLADE OPENING, (MM)
0.20
0.60
1.00
1.40
1.80
2.20
2.60
3.00
3.40
3.80
WIRE DIAMETER (AWG)
12 13 14 15 16 17 18 19 20 21 22 23 24 25 26 27 28 29 30 31 32 33 34

POWER INSERTABLE NYLON COATED MAGNET WIRE

This is a division of application Ser. No. 312,214 filed on Oct. 19, 1981, now U.S. Pat. No. 4,410,592.

DESCRIPTION

1. Technical Field

The field of art to which this invention pertains is lubricant coatings for electrical conductors, and specifically lubricant coated magnet wire.

2. Background Art

In the manufacture of electrical motors, the more magnet wire which can be inserted into a stator core, the more efficient the motor performance. In addition to motor efficiency considerations, motor manufacturers are also interested in manufacture efficiency. Accordingly, such coils where possible are inserted automatically, generally by two methods: either a gun-winding method or a slot insertion method. In the older gun-winding method, the winding is done by carrying the wire into the stator slot by means of a hollow winding needle. Turns are made by the circular path of the gun to accommodate the individual coil slots. As described in Cal Towne's paper entitled "Motor Winding Insertion" presented at the Electrical/Electronics Insulation Conference, Boston, Massachusetts in September, 1979, in the more preferred slot insertion method, coils are first wound on a form, placed on a transfer tool and then pressed off the transfer tool into the stator core slots through insertion guides or blades. In order to accommodate these automated insertion methods, wire manufacturers have responded by producing magnet wires with insulating coatings with low coefficients of friction. Note, for example, U.S. Pat. Nos. 3,413,148; 3,446,660; 3,632,440; 3,775,175; 3,856,566; 4,002,797; 4,216,263; and Published European patent application No. 0-033-244, published Aug. 4, 1981 (Bulletin 8/31).

With the availability of such low friction insulating coatings motor manufacturers began to take advantage of such coatings by inserting an increasing number of wires per slot into the motors. However, it was also well known in this art that there existed a locking wire size range where based on the size of the insulated wires themselves, attempts at inserting a certain number of wires into a particular size slot opening at one time caused a wedging action of the wires with resulting damage to the coated wires. In spite of this fact, in the interest of efficiency and a better product, motor manufacturers continue to insert in a range closely approaching the locking wire size range even though discouraged from doing so by power insertion equipment manufacturers. And while nylon overcoated wires have been known to be successfully inserted in a locking wire size range, this cannot be done reliably on a regular basis as evidenced by surge failure testing, for example.

Accordingly, what is needed in this art, is an insulated magnet wire having a nylon insulation overcoating which can be power inserted into a coil slot in the locking wire size range without damage to the wire.

DISCLOSURE OF INVENTION

The present invention is directed to magnet wire having an outermost insulating layer of nylon overcoated with an external lubricant coating which allows it to be reliably power inserted into a coil slot in its locking wire size range without damage to the insulation. The lubricant comprises a mixture of paraffin wax and a hydrogenated triglyceride.

Another aspect of the invention is directed to wire as described above additionally containing in the nylon insulating layer an internal lubricant comprising esters of fatty acids and fatty alcohols.

Another aspect of the invention is directed to wire as described above additionally containing in the nylon insulating layer an internal lubricant comprising hydrogenated triglyceride.

Another aspect of the invention includes the method of producing such lubricated wires by applying the external lubricant composition in solution to the nylon insulation and drying the coated wire.

Another aspect of the invention includes the method of power inserting such wires into coil slots.

The foregoing, and other features and advantages of the present invention, will become more apparent from the following description and accompanying drawing.

BRIEF DESCRIPTION OF THE DRAWING

The FIGURE demonstrates power insertion locking wire size range as a function of coil slot opening size.

BEST MODE FOR CARRYING OUT THE INVENTION

It is important to use the components of the lubricant composition according to the present invention in particular proportions. In solution in aliphatic hydrocarbon solvent, the paraffin wax should be present in an amount about 0.1% to about 4% by weight, and the hydrogenated triglyceride present in about 0.1% to about 10% by weight, with the balance being solvent. The preferred composition comprises by weight 1% paraffin wax and 1% hydrogenated triglyceride, with balance solvent. While solution application is preferred, if solventless (i.e. molten) application is used, the paraffin and triglyceride should be used in a ratio by weight of about 1:30 to 30:1 and preferably in a ratio of about 1:1. The paraffin wax is preferably petroleum based having a melting point of 122° F. to 127° F. (50° C. to 52.8° C.). Eskar R-25 produced by Amoco Oil Company, having a refractive index of 1.4270 at 80° C., an oil content of 0.24%, specific gravity (at 60° F., 15.6° C.) of 0.839 and a flash point of 415° F. (212.8° C.) has been found to be particularly suitable.

The hydrogenated triglyceride is aliphatic hydrocarbon solvent soluble and has a melting point of 47° C. to 50° C. A hydrogenated triglyceride which has been found to be particularly suitable is Synwax #3 produced by Werner G. Smith, Inc. (Cleveland, Ohio) having an Iodine No. of 22–35, a Saponification No. of 188–195, an Acid No. of 5 (maximum) and has approximate fatty acid component proportions of $C_{14}$ fatty acids-8%, $C_{16}$ fatty acids-34%, $C_{18}$ fatty acids-27%, $C_{20}$ fatty acids-16%, and $C_{22}$ fatty acids-15%.

The solvents for the solution applications of the lubricant composition according to the present invention are preferably aliphatic hydrocarbons with a rapid vaporization rate, but a flash point which is not so low as to present inordinate flammability dangers. Aliphatic hydrocarbons such as naphtha, heptane and hexane can be used. Lacolene™ produced by Ashland Chemical Company, an aliphatic hydrocarbon having a flash point (Tag closed cup) of 22° F. (−5.6° C.), an initial boiling point of 195° F. (90.6° C.) a boiling range of 195° F. (90.6° C.) to 230° F. (110° C.), a specific gravity at 60° F. (15.6° C.) of 0.6919 to 0.7129, and a refractive index at 25° C. of 1.3940 has been found to be particularly suitable. To reduce flammability dangers, any of the above materials may be used in admixture with Freon ® solvents (duPont de Nemours and Co., Inc.).

Preferably, a small amount of esters of fatty alcohols and fatty acids or the above hydrogenated triglyceride (or mixtures thereof) both of which are unreactive and insoluble in the nylon film can be added to the nylon insulation layer to further improve power insertability of the treated wires. Because of the insolubility of the fatty acid ester and triglyceride compositions in the nylon film, they will exude to the surface of the film, further enhancing power insertion in the locking wire size range. The fatty acid ester or triglyceride composition is added to the nylon in amounts of about 0.05% to about 8% by weight, with about 0.5% preferred for the triglyceride composition and about 1% preferred for the fatty acid ester composition. The fatty acid ester and triglyceride compositions can be added to the nylon enamel composition either as it is being formulated or after formulation and prior to application to the wire. In the latter case, the enamel composition should be heated up slightly above room temperature to aid in uniform mixing of the ester or triglyceride composition in the enamel. A fatty acid ester composition which has been found to be particularly suitable is Smithol 76 produced by Werner G. Smith, Inc., which has a Saponification No. of 130–140, an Iodine No. of 85–95 and comprises (in approximate proportions) $C_{12}$ to $C_{14}$ fatty alcohol esters of tall oil fatty acids (54.6%), tri-pentaerythritol esters of tall oil fatty acids (24.5%), tetra-pentaerythritol esters of tall oil fatty acids (9.8%), free tall oil fatty acids (6.3%) and free $C_{12}$ to $C_{14}$ alcohols (4.8%). The preferred triglyceride composition is the Synwax #3 described above.

As the electrically conducting base material, any electrical conductor which requires a lubricant can be treated according to the present invention, although the invention is particularly adapted to wire and specifically magnet wire. The wire is generally copper or aluminum ranging anywhere from 2 to 128 mils in diameter, with wires 10 mils to 64 mils being the most commonly treated wires according to the present invention. The insulating wire coatings to which the lubricant is applied generally ranges from about 0.2 to about 2 mils in thickness, and generally about 0.7 mil to 1.6 mils.

As the nylon insulating layer which is treated with the lubricants according to the present invention, any nylon based material conventionally used in this art can be used including such things as nylon 6, nylon 66, nylon 10, nylon 11, nylon 12, nylon 69, nylon 612 and mixtures and copolymers thereof. This material can be used as a sole coat or part of multi-coat system on such conventional basecoat materials as polyesters, polyurethanes, polyvinylformals, polyimides, polyamide-imides, polyesterimides, etc. and combinations thereof. The lubricants according to the present invention are preferably used in conjunction with nylon 66 or urethane modified nylon 66 overcoated on polyester, and in particular glycerine or tris-hydroxyethyl isocyanurate based polyester basecoats. The preferred treated wire according to the present invention comprises about 75% by weight basecoat and about 25% by weight nylon overcoat based on total insulation coating weight.

The external lubricant can be applied by any conventional means such as coating dies, rollers or felt applicators. The preferred method of application utilizes a low boiling hydrocarbon solvent solution of the lubricant which can be applied with felt applicators and air dried, allowing a very thin "wash coat" film of lubricant to be applied to the wire. While the amount of lubricant in the coating composition may vary, it is most preferred to use approximately 1% to 3% of the lubricant dissolved in the aliphatic hydrocarbon solvent. And while any amount of lubricant coating desired can be applied, the coating is preferably applied to represent about 0.003% to about 0.004% by weight based on total weight of wire for copper wire, and about 0.009% to about 0.012% for aluminum wire.

EXAMPLE 1

A copper wire approximately 22.6 mils in diameter was coated with a first insulating layer of THEIC based polyester condensation polymer of ethylene glycol, tris-hydroxyethyl isocyanurate and dimethylterephthalate. Over this was applied a layer of nylon 66. The insulating layers were approximately 1.6 mils thick with about 75% of the coating weight constituted by the polyester basecoat, and about 25% by the nylon topcoat.

500 grams of paraffin wax (Eskar R-25) and 500 grams of hydrogenated triglyceride (Synwax #3) were added to approximately 9844 grams of aliphatic hydrocarbon solvent (Lacolene). The resulting solution had a clear appearance, a specific gravity at 25° C. of 0.715–0.720, and an index refraction at 25° C. of 1.4005–1.4023. The solvent was heated above room temperature, preferably to a point just below its boiling point. The paraffin wax was slowly brought to its melting point and added to the warm solvent. The hydrogenated triglyceride was similarly slowly brought to its melting point and added to the warm solvent. The blend was mixed thoroughly for 5 minutes. The nylon overcoated THEIC polyester wire was run between two felt pads partially immersed in the above formulated lubricant composition at a rate of about 70 feet to 80 feet per minute (21 M/min to 24 M/min) and the thus applied coating air dried. The lubricant represented about 0.003% to about 0.004% by weight of the entire weight of the wire.

EXAMPLE 2

The same procedure followed in Example 1 was performed here, with the exception that 0.5% by weight based on total weight of the nylon insulating layer was comprised of hydrogenated triglyceride (Synwax #3). The hydrogenated triglyceride composition was added to the nylon enamel when it was in solution prior to the application to the wire. Multiple windings of the thus lubricated wire were power inserted simultaneously into the stators in its locking wire size range with no damage to the insulated magnet wire. As can be clearly seen from the FIGURE, where the area A on the curve represents the locking wire size range as a function of insertion bladed coil slot opening (coil slot opening less 0.8 mm), for this wire size and coil slot size the coated wire was clearly within locking wire size range and yet inserted with no problem. In effect, what the lubricated wires according to the present invention have accomplished is to shrink area A in the FIGURE to the point of eliminating magnet wires according to the present invention.

As described above, problems have been incurred with the use of lubricant coated magnet wire in attempts to power insert in the locking wire size range. Previously, it was felt that conventional coefficient of friction testing was sufficient for predicting the feasibility of power inserting a particular magnet wire into coil slots. However, it has now been found that perpendicularly oriented wire to wire, and wire to metal (insertion blade composition and polish), coefficient of friction data at increasing pressure levels are necessary for true power insertion predictability. For example, in conventional coefficient of friction tests where both lubricant treated nylon and lubricant treated polyamide-imide coatings had identical coefficients of friction, the nylon could be made to successfully power insert and the polyamide-imide couldn't. The compositions of the present invention provide the necessary increasing pressure coefficient of friction properties to the insulated magnet wires for successful power insertion predictability.

While many of these components have been used as lubricants, and even as lubricants in the insulated electrical wire field, there is no way to predict from past performance how such lubricants would react to power insertion in coil slots in the locking wire size range specifically cautioned against by power insertion equipment manufacturers. Accordingly, it is quite surprising that the combination of such conventional materials in the ranges prescribed would allow for such reliably (substantially 100%) successful power insertion of nylon overcoated materials in the locking wire size range without damage to the insulated wire.

Although the invention has been primarily described in terms of the advantage of being able to power insert magnet wire according to the present invention in its locking wire size range, the lubricants of the present invention impart advantages to the magnet wires even when they are inserted outside the locking wire size range, and even when the magnet wires are not intended to be power inserted at all. For those magnet wires which are power inserted outside the locking wire size range, less damage is imparted to the wires as compared to similar wires with other lubricants, and it is possible to insert at lower pressures which further lessens damage to the wires. This results in a much lower failure rate (e.g. under conventional surge failure testing) for power inserted coils made with wire according to the present invention than with other lubricated wires. And for those wires which are not power inserted, much improved windability is imparted to such wires, also resulting in less damage to the wires than with other lubricants.

Furthermore, although only particular compositions are specifically disclosed herein, it is believed that as a class, esters non-reactive with and insoluble in the nylon film insulation, resulting from reaction of $C_8$ to $C_{24}$ alcohols having 1 to 12 hydroxyls with $C_8$ to $C_{24}$ fatty acids including some portions containing free alcohol and free acid can be used as lubricants according to the present invention, either admixed with paraffin as an external lubricant, or alone (or as admixtures themselves) as internal lubricants. These materials can also by hydrogenated to reduce their unsaturation to a low degree. It is also believed from preliminary testing that $C_{12}$ to $C_{18}$ alcohols and mixtures thereof are similarly suitable lubricants for use according to the present invention. However, even in the broad class only particular combinations have been found acceptable. Although not desiring to be limited to any particular theory it is believed that factors responsible for this are 1) the potential of the lubricants to interact in molecular fashion with the metal contact surface, e.g. the metal of the insertion blades, and 2) the ability of the lubricant to be or become liquid and stable under pressure condition, e.g. in the insertion process.

Although the invention has been shown and described with respect to detailed embodiments thereof, it will be understood by those skilled in the art that various changes in form and detail thereof may be made without departing from the spirit and scope of the claimed invention.

We claim:

1. A method of coating an electrically insulated magnet wire having an outer coating of nylon insulation comprising applying aliphatic hydrocarbon solvent solution of hydrogenated triglyceride and paraffin wax onto the nylon insulation, the paraffin wax present in the solution at about 0.1% to about 4% by weight having a melting point of 50° C. to 52.8° C., a refractive index of 1.4270 at 80° C., a specific gravity of 0.839 at 15.6° C., and a flash point of 212.8° C., the hydrogenated triglyceride present at about 0.1% to about 10% by weight, having a melting point of 47° C. to 50° C., an Iodine Number of 22 to 35, a Saponification Number of 188 to 195, a maximum Acid Number of 5 and approximate fatty acid component proportions of 8% $C_{14}$, 34% $C_{16}$, 27% $C_{18}$, 16% $C_{20}$ and 15% $C_{22}$ fatty acids, in such amounts as to enable the resultant coated wire to be power inserted into coil slots in its locking wire size range without damage, and drying the coated wire.

2. The method of claim 1 wherein the ratio of paraffin wax to hydrogenated triglyceride is approximately 1:1.

3. The method of claim 1 wherein the wire has an electrically insulating layer of polyester, polyvinylformal or polyurethane under the nylon outer coating.

4. The method of claim 1 wherein the wire additionally contains in the nylon insulating layer about 0.05% to about 8% by weight of an internal lubricant comprising esters of fatty acids and fatty alcohols.

5. The method of claim 1 wherein the wire additionally contains in the nylon insulating layer about 0.05% to about 8% by weight of an internal lubricant comprising hydrogenated triglyceride.

6. The method of claim 4 wherein the paraffin wax and hydrogenated triglyceride are present in about equal amounts and the internal lubricant is present at about 1% by weight.

7. The method of claim 5 wherein the paraffin wax and hydrogenated triglyceride are present in about equal amounts and the internal lubricant is present at about 0.5% by weight.

8. In the process of power inserting prewound lubricated magnet wire into coil slots with substantially no evidence of wire damage in subsequent surge failure testing, the improvement comprising reliably power inserting magnet wire in the locking wire size range having an outer layer of nylon insulation coated with an external lubricant mixture of paraffin wax and hydrogenated triglyceride in a ratio by weight of about 1:30 to about 30:1, the paraffin wax having a melting point of 50° C. to 52.8° C., a refractive index of 1.4270 at 80° C., a specific gravity of 0.839 at 15.6° C., and a flash point of 212.8° C., the hydrogenated triglyceride having a melting point of 47° C. to 50° C., an Iodine Number of 22 to 35, a Saponification Number of 188 to 195, a maximum Acid Number of 5 and approximate fatty acid component proportions of 8% $C_{14}$, 34% $C_{16}$, 27% $C_{18}$, 16% $C_{20}$ and 15% $C_{22}$ fatty acids.

9. The process of claim 8 wherein the wire has an electrically insulating layer of polyester, polyvinylformal or polyurethane under the nylon outer coating.

10. The process of claim 8 wherein the wire additionally contains in the nylon insulation layer about 0.05% to about 8% by weight of an internal lubricant comprising esters of fatty acids and fatty alcohols.

11. The process of claim 8 wherein the wire additionally contains in the nylon insulation layer about 0.05% to about 8% by weight of an internal lubricant comprising hydrogenated triglyceride.

12. The process of claim 10 wherein the paraffin wax and hydrogenated triglyceride are present in about equal amounts, and the internal lubricant is present in about 1% by weight.

13. The process of claim 11 wherein the paraffin wax and hydrogenated triglyceride are present in about equal amounts and the internal lubricant is present in about 0.5% by weight.

* * * * *